Figure 15:
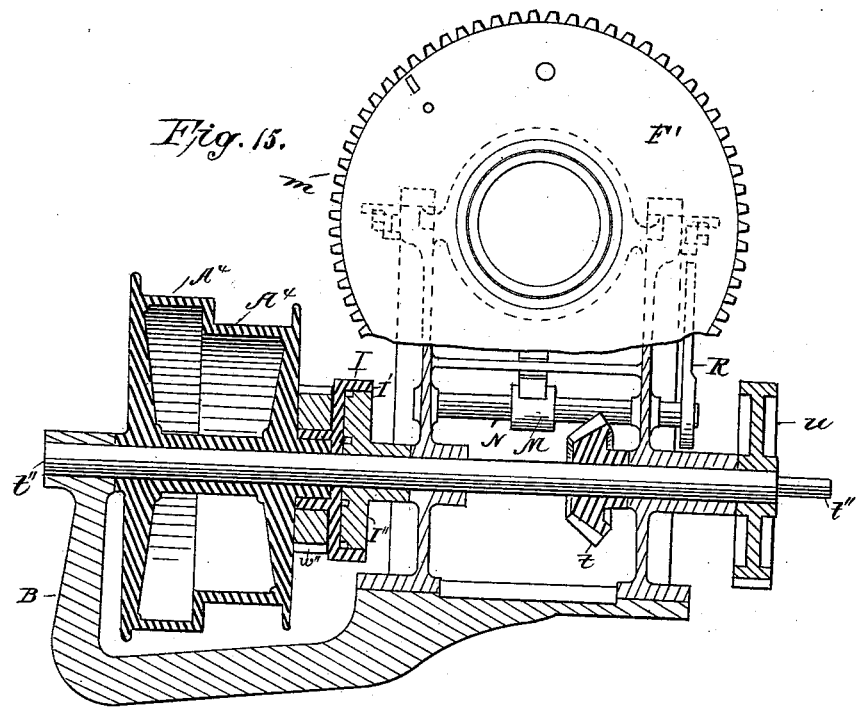
Figure 17:
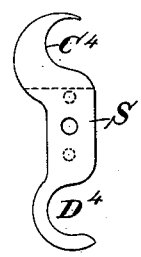

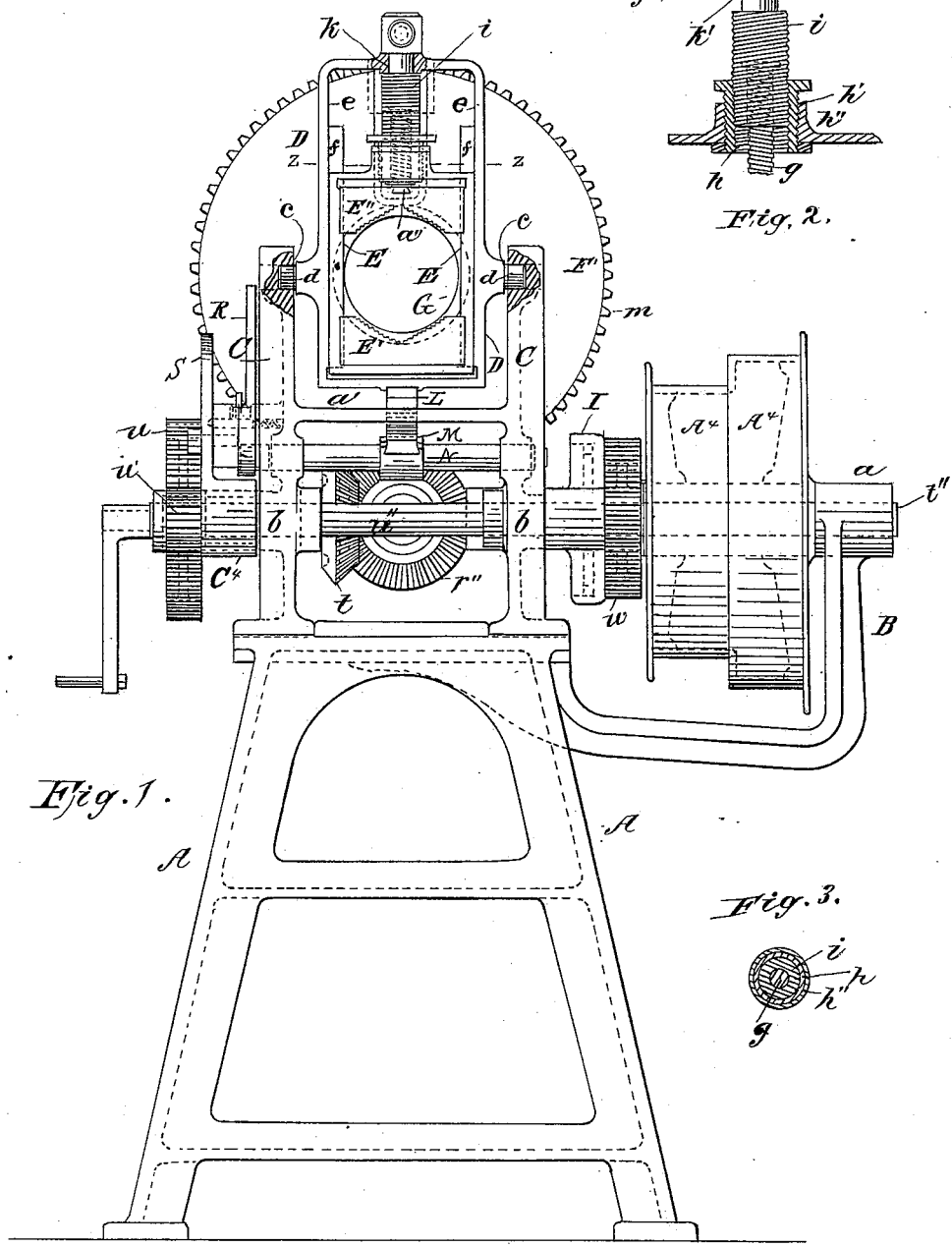

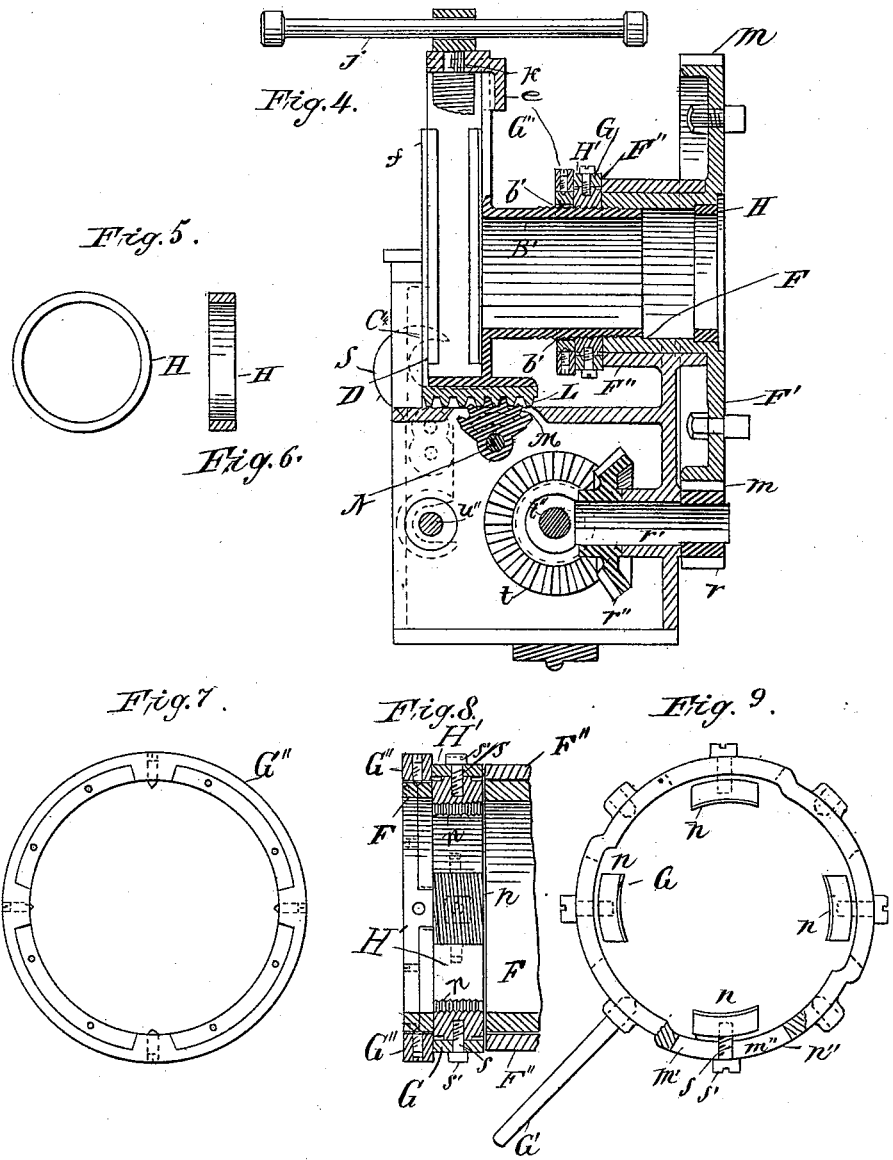

(No Model.) 6 Sheets—Sheet 3.
A. SAUNDERS.
MACHINE FOR CUTTING AND SCREW THREADING TUBES, &c.
No. 372,490. Patented Nov. 1, 1887.
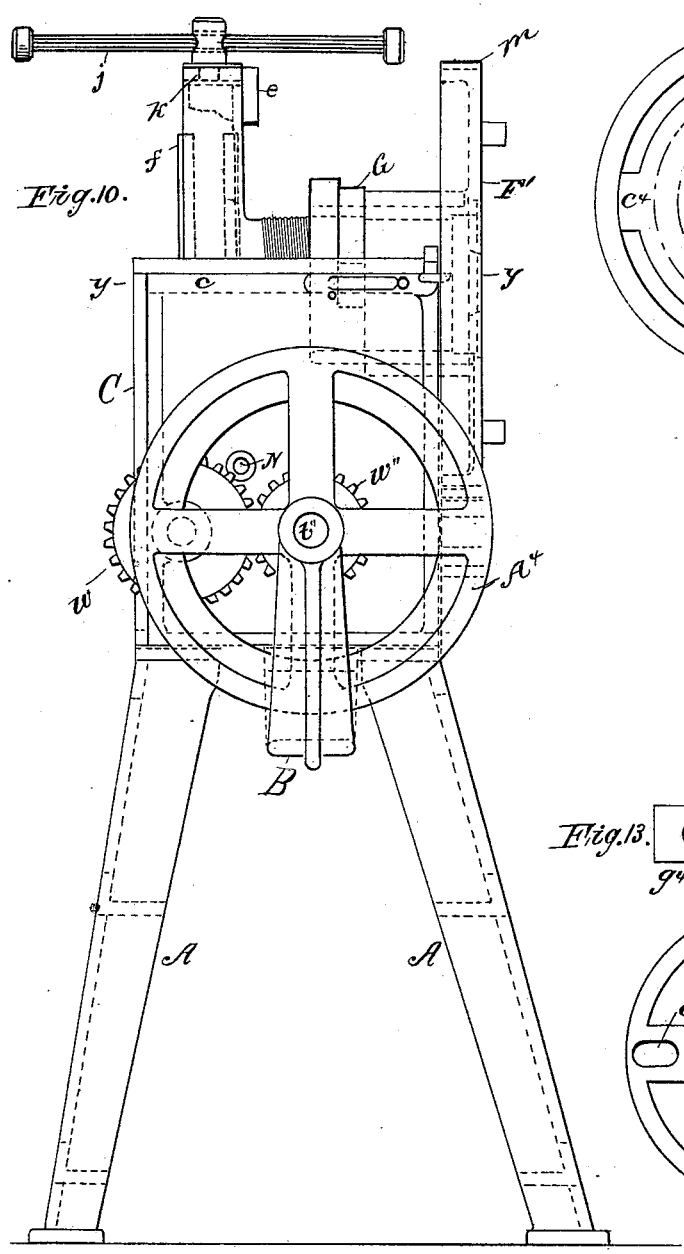
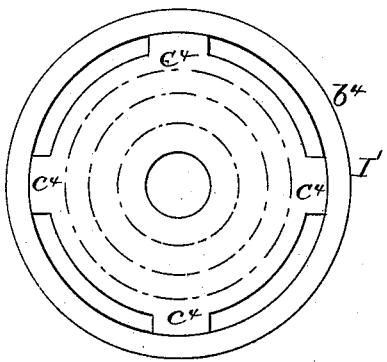
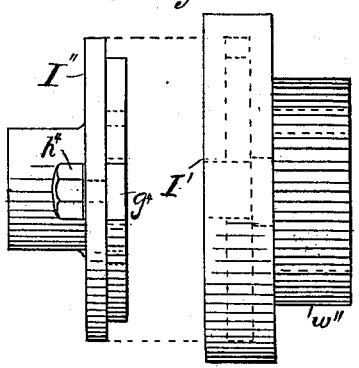
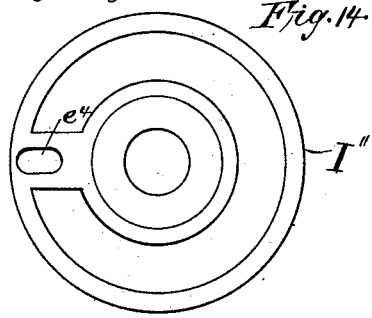
WITNESSES:
C. W. Benjamin
Charles A. Herbert
INVENTOR
Alexander Saunders
BY
James A. Whitney
ATTORNEY (No Model.) 6 Sheets—Sheet 4.

A. SAUNDERS.
MACHINE FOR CUTTING AND SCREW THREADING TUBES, &c.

No. 372,490. Patented Nov. 1, 1887.

WITNESSES:
C. W. Benjamin
Charles A. Herbert

INVENTOR
Alexander Saunders
BY James A. Whitney
ATTORNEY (No Model.)
6 Sheets—Sheet 5.
A. SAUNDERS.
MACHINE FOR CUTTING AND SCREW THREADING TUBES, &c.
No. 372,490. Patented Nov. 1, 1887.
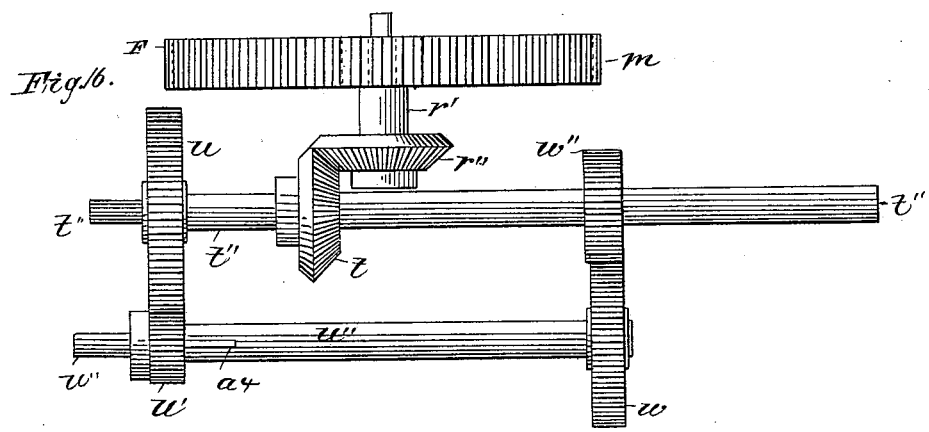
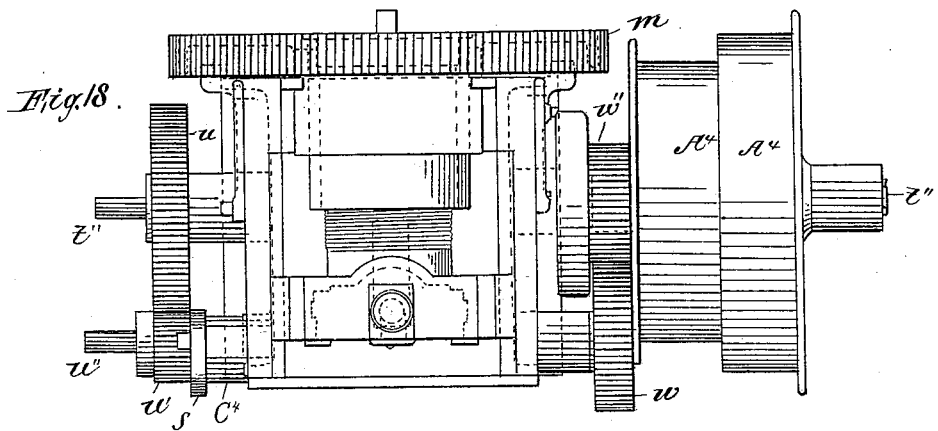

(No Model.) 6 Sheets—Sheet 6.

A. SAUNDERS.
MACHINE FOR CUTTING AND SCREW THREADING TUBES, &c.

No. 372,490. Patented Nov. 1, 1887.

WITNESSES
Charles A. Herbert.
Isidore A. Levy.

INVENTOR
Alexander Saunders
per James A. Whitney
Attorney.

UNITED STATES PATENT OFFICE.

ALEXANDER SAUNDERS, OF YONKERS, NEW YORK.

MACHINE FOR CUTTING AND SCREW-THREADING TUBES, &c.

SPECIFICATION forming part of Letters Patent No. 372,490, dated November 1, 1887.

Application filed April 14, 1887. Serial No. 234,826. (No model.)

*To all whom it may concern:*

Be it known that I, ALEXANDER SAUNDERS, a citizen of the United States, residing at Yonkers, in the county of Westchester and State of New York, have invented certain new and useful Improvements in Machines for Working Pipes, Cylindrical Rods, &c.; and I do hereby declare that the following is a full, clear, and exact description of the invention, which will enable others skilled in the art to which it appertains to make and use the same.

This invention is principally intended for cutting screw threads upon cylindrical rods, tubes, pipes, &c.; but certain of its features may be advantageously employed in connection with the mechanism for transversely cutting or separating such articles.

The invention comprises certain novel combinations of parts whereby the rod, pipe, or tube to be operated upon may be readily brought to and retained in the requisite position with reference to the screw-cutting dies, or the cutting mechanism, as the case may be, whereby great stability is given to the article while being worked or operated upon by the screw-cutting dies, or by the cutting-off devices, as the case may be, whereby the speed and power of the rotating head, provided to carry the screw-cutting dies or cutting-off devices, as the case may be, in its operation with the other portions of the mechanism, may be varied to suit the exigencies of the work, whereby provision is made for retaining the axis of the article to be operated upon in due relation with the axis of motion of the screw-cutting dies, or of the cutting-off devices, as the case may be, whereby provision is made for releasing the said head from the feed mechanism which regulates the passage of the article to the screw-cutting dies, in order to permit the machine to be applied to other uses, whereby provision is made for a very accurate and effective feeding of the article to be screw-threaded to and through the screw-cutting dies, and whereby provision is made for the adjustment of the jaws which hold the article to be operated upon in such manner that the axis of said article may be brought accurately into the axial or central line of the screw-cutting dies.

Figure 1 is a front elevation and partial sectional view of a machine embracing my said invention. Fig. 2 is a detail view, on a larger scale, of certain parts of said machine. Fig. 3 is a horizontal sectional view, taken in the line *z z* of Fig. 1, of certain parts included in said machine. Fig. 4 is a vertical transverse sectional view taken in a plane at right angles to Fig. 1 and in the line *y y* of Fig. 1. Figs. 5 to 9, inclusive, are detail views, on a larger scale, of certain parts included in said machine. Fig. 10 is a side elevation as seen from the right-hand side of Fig. 1. Figs. 11 to 14, inclusive, are detail views of certain parts included in said machine. Figs. 15, 16, 17, 19, 20, and 21 are detail views of certain parts of said machine, and Fig. 18 is a plan or top view of said machine.

A is the supporting-frame of the machine, of any suitable construction.

B is a bracket, which contains the box or bearing *a* of the driving-shaft *t''*, the opposite end of which is sustained in suitable bearings, *b b*, provided in two standards, C C, preferably cast in one, with a cross-bar, *a'*, and which are secured upon the supporting-frame A in any suitable manner. These standards are seen from the rear end in Fig. 1, and one of them is shown from the side in Fig. 10. At the inner side of each standard, near its upper edge, is a horizontal groove or guide, *c*, more fully shown in the section portion of Fig. 1, and also indicated in the dotted outline in Fig. 10. Into these guides *c c* are fitted correspondingly-shaped horizontal splines *d*, provided upon the sides of a cage, D, which carries a chuck, herein presently described, and which has extending forward a sleeve, B', threaded externally at its forward end, as indicated at *b'* in Fig. 4. The rod, pipe, or tube to be worked is placed within this sleeve B' during the working thereof, and as near as may be to the central or axial portion thereof. At the inner side of each of the lateral portions *e* of the cage D is a vertical guide, *f*, which fits into a corresponding groove in the adjacent side or edge of a frame, E, in the lower part of which is the lower jaw, E', of a gripping-chuck. The opposite inner vertical edges of this frame E constitute guides, which fit into correspondingly-shaped vertical grooves formed in the ends of the upper jaw, E'', of said chuck.

This upper jaw, E″, is suspended from the lower extremity, a‴, of a screw, g, which extends downward through the central space of a double nut, h, which is itself screwed into a nut, h′, provided in the boss h″ at the top of the frame E. Into the inner thread of the double nut h is screwed a screw-bolt, i, as more fully represented in Figs. 2 and 3. This screw-bolt i may be turned as required by a suitable lever, j, provided in its head, as represented in Fig. 2. This screw-bolt i is made hollow and provided with an internal screw-thread—the reverse of the external screw-thread of said screw-bolt, but of the same pitch—said internal thread of said screw-bolt i receiving the upper end of the screw g, from which is suspended the upper jaw, E″, of the gripping-chuck, as hereinbefore explained. By turning the screw-bolt i in one direction, the external thread thereof lowers the frame E, and consequently the lower jaw, E′, thereof, and simultaneous with this the internal thread of said screw-bolt i raises the screw g and moves upward the upper jaw, E″, in the same ratio as the jaw E′, aforesaid, so that by the said means the said jaws may be moved to or from each other to clasp or release the pipe or article to be held between them while being threaded or operated upon. It is necessary, however, for the purposes of my invention, that the axis of the space between the jaws, when the same are brought toward each other, should be accurately coincident with the axis of motion of the threading or cutting devices, as the case may be; and in order that the jaws E″ and E′ may be bodily raised and lowered to adjust the axis of the said space to said relation with the axis, around which move the threading or cutting devices, as the case may be, is provided the double nut h, hereinbefore described, so that by turning said double nut in one direction or the other, the frame E may be raised or lowered, as occasion may require.

The screw-bolt i, it is to be observed, is suspended in a suitable bearing, k, provided at the upper end of the cage D and suitably placed around the vertical neck or journal k′ of said screw-bolt. The externally-threaded sleeve B′ extends forward into the rearmost part of a sleeve, F, which latter is provided upon the rearmost side of a face-plate, F′, upon the circumference of which, and concentric with the axis thereof, are cogs or teeth m, so that the said teeth and face-plate together constitute not only a face-plate, for purposes hereinafter explained, but also a spur-wheel, by means of which motion around the axial line of the space between the jaws E′ E″ is secured.

Motion is given, through the teeth or gear m, to the face-plate F′, as hereinafter explained, the said face-plate and its sleeve F being supported in a suitable bearing or journal box F‴, duly connected with the stationary or fixed part of the machine. At the inner end of the sleeve F, and at suitable distances apart, are rectangular openings or sockets, in which are placed the sections n of a sectional nut, H′, the structure and purposes of which are hereinafter set forth. The inner surfaces of these sections n are threaded to act in connection with the screw-thread of the sleeve B′. These sections may be of any desired number; but it is preferred that there be four of them, arranged equidistant around the circumference of the sleeve F. Each of the sections n has attached to it an outwardly-extending bolt, s, which projects through a slot, m′, in an adjacent cam portion, m″, of a cam-ring, G, fitted around and external to the sleeve F and the nut-sections n. The heads s′ of the bolts s ride upon the outer surface of the cam portions m″, aforesaid, and the cam-ring G is provided with a lever or handle, G′, by which it may be turned around the axis of the sleeves F and B′.

When turned in one direction, the cam portions m″ depress the nut-sections n, so that they mesh with the screw-thread of the sleeve B′, and thereby enable the said sleeve B′, together with the chuck connected therewith, to be moved inward or outward, as the case may be, by the rotation in one direction or the other of the sleeve F; or, in other words, of the face-plate F′, attached to said sleeve. The cam-ring G is kept from moving out of place toward the face-plate F′ by the adjacent edge of the journal F‴, and from moving out of place in the opposite direction by a collar, G″, secured to the inner end of the sleeve F.

The pipe, tube, or cylindrical rod to be operated upon being thrust forward between the jaws E′ and E″ and gripped thereby, as hereinbefore explained, and any suitable screw-threading mechanism being secured, in the ordinary or in any appropriate manner, upon the face-plate F′, to rotate with the said face-plate and around the axis of the pipe, tube, or cylindrical rod, as the case may be, the rotation in the requisite direction of the said face-plate F′, and sleeve F causes the nut-sections n to feed inward the sleeve B′, and consequently the pipe, tube, or cylindrical rod, as the case may be, to the screw-threading device or mechanism carried by the face-plate, as aforesaid. When the requisite length of the pipe has been duly threaded, a reverse movement of the cam-ring G causes the cams m″ thereof to lift the nut-sections n out of contact with the thread of the sleeve B′, thereby permitting the sleeve F and face-plate F′ to revolve without further feeding the article worked or operated upon. By removing the screw-threading devices and replacing the same by any suitable cutting mechanism fed to its working in any appropriate manner, the pipe, tube, or rod, as the case may be, may be severed or cut off by a further rotation of the face-plate F, carrying the cutting devices. The forward or outermost end of the sleeve F is rabbeted to receive a detachable bushing, H. (Shown in the front view and in section in Figs. 5 and 6, respectively.) The internal diameter of this bushing may be proportioned to that of the article to be operated upon by the machine. Motion is given to the face-plate F', through its gear-teeth m, from a pinion, r, on the opposite end of the shaft r' of which is a beveled pinion, r'', which gears into a similar beveled pinion, t, the shaft t'' of which is provided with a spur-wheel, u, which gears into a spur-pinion, u', on another shaft, u'', which is also provided with a spur-wheel, w, which latter gears into a spur-pinion, w'', loose on the shaft t'', and which, as represented in Fig. 18, has the cone-pulleys $A^4$ attached thereto. The shaft u'' is provided with a longitudinal feather, $a^4$, which passes through a suitable groove, provided, to the bore of the pinion u', so that when the said pinion is brought into gear with the spur-wheel u, as shown in Fig. 16, motion will be transmitted from the one to the other, whereas by sliding the pinion u' along the feather $a^4$ it may be brought out of gear with the wheel u, so that the latter may rotate independently.

Fast upon the inner side of the pinion w'' is provided the part I' of a clutch, I, the other part, I'', of which is fast upon the shaft t''. The part I'' is of such radius as to pass within the circumferential flange $b^4$ of the part I', the latter being provided internally with recesses $c^4$. In the part I'' is a radial slot, $e^4$, through which is placed the bolt $f^4$, the elongated head $g^4$ of which is on the side of the part I'', contiguous to the part I', while the nut $h^4$ of said bolt is on the other or opposite side of the part I''. The several parts of the clutch I are represented in Figs. 11 to 14, inclusive.

Figure 19:
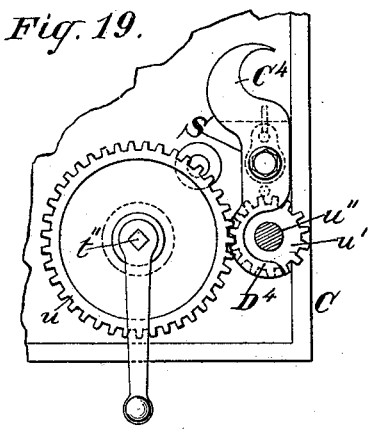
Figure 20:
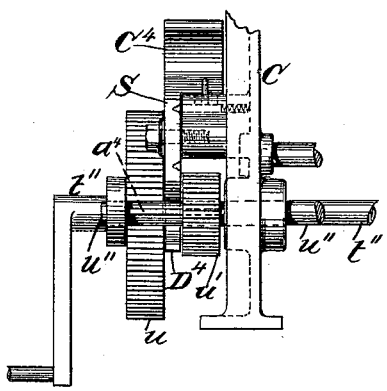
Figure 21:
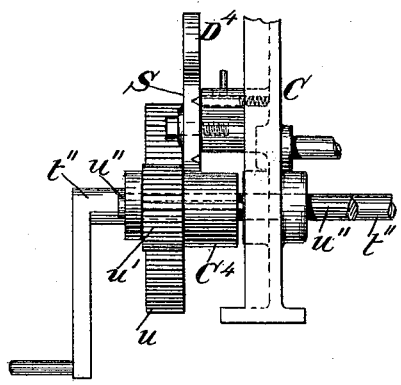

When the bolt $f^4$ is moved to the inner end of the slot $e^4$, the parts I' and I'' are disconnected, so that no motion is transmitted from the pulleys $A^4$ to the shaft t''; but when the said bolt is moved outward to the outer end of the slot $e^4$ its head $g^4$ is fitted into one or the other of the recesses $c^4$, and the bolt $f^4$ being duly held in position by tightening its nut $h^4$, motion is transmitted from the part I'' to the part I', and thereby from the pulleys $A^4$ direct to the shaft t'', and thence, through the beveled pinions t and r'', to the face-plate, the precaution being first taken to move the pinion u' out of gear with the spur-wheel u, which may be done by hand. By the means just described a comparatively high velocity is given to the rotation of the face-plate F'. When less velocity and greater power are required, the parts or sections I' and I'' of the clutch I are disconnected to permit the pulleys $A^4$ and spur-pinion w'' to run loose upon the shaft t'', and the pinion u' is brought into gear with the spur-wheel u, whereupon motion is transmitted from the pinion w'' to the spur-wheel w, thence through the pinion u' and spur-wheel u to the shaft t'', and thence to the beveled pinions t and r'' to the face-plate F'. In order to retain the pinion u' in its two distinctive positions, hereinbefore described, there is pivoted adjacent thereto a double reversible hook, S, the construction and operation of which is illustrated in Figs. 17, 19, 20, and 21. When the one claw $C^4$ of this double hook S is swung over to the shaft u'', as represented in Fig. 21, it passes on the inner side of the pinion u', and thereby retains the said pinion in gear with the spur-wheel u. When the hook is reversed, the pinion u' being first brought out of gear with the spur-wheel u, the opposite end or portion $D^4$ of the hook is brought on the outer side of said pinion, as shown in Figs. 19 and 20, and prevents the same from coming into gear with the spur-wheel u.

In order to move inward and outward the sleeve B', and the chuck carried thereby, a rack, L, is provided at the bottom of the cage D, which carries the said chuck, and into this gears a toothed quadrant or sector, M, the shaft N of which is provided with a lever, R, by which said shaft and sector may be rocked or turned in one direction or the other, thereby giving the requisite rectilinear movement to the sleeve B' and to the chuck.

What I claim as my invention is—

1. The combination of the sleeve F, bearings F'', for said sleeve, face-plate F', provided to the said sleeve, sleeve B', longitudinally adjustable with reference to the sleeve F, cage D, provided to the sleeve B', provided with the bearing k and guides f, the frame E, having nut h' and double nut h, internally-threaded screw-bolt i, screw g, and gripping jaws E' E'', all substantially as and for the purpose herein set forth.

2. The combination of the sleeve F, bearings F'', for supporting said sleeve, face-plate F', provided to said sleeve, externally-threaded sleeve B', a sectional nut, H', constructed and arranged to grasp and release the screw-thread b' of the sleeve B', the cage D, provided to the sleeve B', and constructed with the guides f, the jaws E' E'', adjustable within the frame E, and devices for adjusting the said jaws with reference to each other and to the axis of the sleeves B' F, substantially as and for the purpose herein set forth.

3. The combination, with the face-plate F' and sleeves F and B', of the cage D, provided with guides arranged in a plane coincident with the axis of the sleeves F and B', and jaws E' E'', supported by the said cage and adjustable with reference to the axial line of the sleeves F and B', substantially as and for the purpose herein set forth.

4. The combination, with the face-plate F' and sleeves F and B', of the cage D, provided with guides f, the frame E, adjustable upon said guides f, jaws E' E'', and devices for adjusting the said frame E and jaws E' E'' with reference to each other and to the cage D, substantially as and for the purpose herein set forth.

5. The combination, with the sleeve F, having the face-plate F', and with the externally-threaded sleeve B', carrying the mechanism for feeding the article to be worked, of the sectional nut H', composed of the cam-ring G, constructed with slots $m'$, the nut-sections $n$, and the bolts $s$, having heads $s'$, all substantially as and for the purpose herein set forth.

6. The combination, with the sleeve F, having the face-plate F', and with the externally-threaded sleeve B', carrying the mechanism for holding the article to be worked, of the sectional nut H', composed of the cam-ring G, constructed with slots $m'$, the nut-sections $n$, and bolts $s$, having heads $s'$ for feeding and releasing the sleeve B', and the rack L and sector M, for actuating the sleeve B' with reference to the sleeve F when released from the feeding action of the nut-sections $n$, substantially as and for the purpose herein set forth.

7. The combination, with the sleeve F, having the face-plate F', and with the externally-threaded sleeve B', carrying the mechanism for feeding the article to be worked, of the sectional nut H', composed of the cam-ring G, constructed with slots $m'$, nut-sections $n$, and bolts $s$, having heads $s'$ for feeding and releasing the sleeve B', the rack L and sector M, for actuating the sleeve B' with reference to the sleeve F when released from the feeding action of the nut-sections $n$, the cage D, constructed with guides $f$, the frame E, jaws E' E'', and devices for adjusting the said frame E and jaws E' E'' with reference to each other and to the cage, substantially as and for the purpose herein set forth.

8. The combination, with the sleeve F, having the face-plate F', and with the externally-threaded sleeve B', carrying the mechanism for feeding the article to be worked, of the sectional nut H', composed of the cam-ring G, constructed with slots $m'$, nut-sections $n$, and bolts $s$, having heads $s'$ for feeding and releasing the sleeve B', the rack L and sector M, for actuating the sleeve B' with reference to the sleeve F when released from the feeding action of the nut-sections $n$, the cage D, constructed with lateral guides coincident with the axis of the sleeves F B', and provided with gripping-jaws for holding the article to be worked upon, substantially as and for the purpose herein set forth.

9. The combination, with the sleeve F, having the face-plate F', and with the externally-threaded sleeve B', carrying the mechanism for feeding the article to be worked, of the sectional nut H', composed of the cam-ring G, constructed with slots $m'$, nut-sections $n$, and bolts $s$, having heads $s'$ for feeding and releasing the sleeve B', the rack L and sector M, for actuating the sleeve B' with reference to the sleeve F when released from the feeding action of the nut-sections $n$, the cage D, constructed with lateral guides coincident with the axis of the sleeves F B' and with the guides $f$, a frame, E, adjustable on said guides $f$, jaws E' E'', adjustable in the frame E, and devices for adjusting said jaws and frame with reference to each other and to the cage D, substantially as and for the purpose herein set forth.

10. The combination, with the sleeve F, having the face-plate F', and with the externally-threaded sleeve B', carrying the mechanism for feeding the article to be worked, of the sectional nut H', composed of the cam-ring G, constructed with slots $m'$, nut-sections $n$, and bolts $s$, having heads $s'$ for feeding and releasing the sleeve B', the rack L and sector M, for actuating the sleeve B' with reference to the sleeve F when released from the feeding action of the nut-sections $n$, the cage D, constructed with lateral guides, a frame, E, adjustable on said guides $f$, jaws E' E'', adjustable in the frame E, nut $h'$, double nut $h$, internally-threaded screw-bolt $i$, and screw $g$, for adjusting the jaws E' E'' and the frame E with reference to each other and to the cage D, substantially as and for the purpose herein set forth.

11. The combination, with the face-plate F' and its sleeve F, of the threaded sleeve B', provided with jaws for holding the article to be worked upon, the sectional nut, composed of the slotted cam-ring G, nut-sections $n$, and bolts $s$, substantially as and for the purpose herein set forth.

12. The combination of the sleeve F, having the face-plate F', the externally-threaded sleeve B', carrying the mechanism for feeding the article to be worked, the sectional nut H', a spur-wheel, $u$, connected by suitable gearing with the sleeve F, or its face-plate F', shaft $u''$, spur-pinion $u'$, movable on said shaft and with reference to the spur-wheel $u$, and the double reversible hook S, having ends $C^4$ and $D^4$, for holding the said pinion in or out of gear with the said spur-wheel, as the case may be, substantially as and for the purpose herein set forth.

ALEXANDER SAUNDERS.

Witnesses:
CHARLES A. HERBERT,
ALBERT C. AUBERY.